United States Patent
Metz et al.

(10) Patent No.: US 7,018,549 B2
(45) Date of Patent: Mar. 28, 2006

(54) METHOD OF FABRICATING MULTIPLE NANOWIRES OF UNIFORM LENGTH FROM A SINGLE CATALYTIC NANOPARTICLE

(75) Inventors: Matthew V. Metz, Hillsboro, OR (US); Scott A. Hareland, Lino Lakes, MN (US); Robert S. Chau, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 10/748,617

(22) Filed: Dec. 29, 2003

(65) Prior Publication Data

US 2005/0145596 A1    Jul. 7, 2005

(51) Int. Cl.
*B82B 3/00* (2006.01)

(52) U.S. Cl. .............. 216/2; 216/87; 216/95; 216/99; 216/100; 117/1; 117/2; 117/75; 117/83; 117/87; 977/DIG. 1

(58) Field of Classification Search ............ 216/2, 216/87, 95, 99, 100; 117/1, 2, 75, 83, 87; 977/DIG. 1
See application file for complete search history.

(56) References Cited

U.S. PATENT DOCUMENTS 6,773,616 B1 *   8/2004   Chen et al. ............... 216/41

2002/0130311 A1 *   9/2002   Lieber et al. .............. 257/1
2004/0026684 A1 *   2/2004   Empedocles .............. 257/14
2004/0113139 A1 *   6/2004   DeHon et al. ............. 257/9
2004/0144970 A1 *   7/2004   Wang et al. .............. 257/17

OTHER PUBLICATIONS

Yiying Wu et al., Block-by-Block Growth of Single Crystalline Si/SiGe Superlattice Nanowires, Nano Letters, Feb. 2002, vol. 2, No. 2, pp. 83-86.*

M. T. Bjork et al., One-dimensional Steeplechase for Electrons Realized, Nano Letters, Feb. 2002, vol. 2, No. 2, pp. 87-88.*

Gudiksen et al., Growth of Nanowire Superlattice Structures for Nanoscale Photonics and Electronics, Nature 2001, vol. 415 p 617-620.*

Cui, Y., et al., "Diameter-controlled synthesis of single-crystal silicon nanowires," Applied Physics Letters, Apr. 2001, vol. 78, No. 15, pp. 2214-2216.

* cited by examiner

*Primary Examiner*—Allan Olsen
(74) *Attorney, Agent, or Firm*—Blakely, Sokoloff, Taylor & Zafman LLP

(57) ABSTRACT

A method is described for fabricating multiple nanowires of uniform length from a single precursor nucleation particle. The method includes growing a first nanowire segment from a nanoparticle and growing a second nanowire segment between the first nanowire segment and the nanoparticle. The first nanowire segment and the second nanowire segment have a different solubility.

18 Claims, 4 Drawing Sheets

METHOD OF FABRICATING MULTIPLE NANOWIRES OF UNIFORM LENGTH FROM A SINGLE CATALYTIC NANOPARTICLE

BACKGROUND

1. Field

Embodiments relate generally to nanowires and more particularly, to a method of fabricating nanowires.

2. Background

Nanowires may be used in fabrication of various devices, such as transistors, displays, sensors or other devices. Typically, nanowires are formed using catalytic particles, such as gold particles. One conventional technique for forming nanowires involves providing catalytic particles on a surface of a substrate as described in block 110 of FIG. 1. Then, the catalytic particles are exposed to a vapor precursor, such as silane, under conditions suited to catalyze growth of silicon nanowires, as described in block 120 of FIG. 1. The nanowires 204 grown using conventional techniques may be inadequate for certain applications due to difficulties associated with producing nanowires of uniform lengths. FIG. 2 illustrates nanowires 204 grown using conventional techniques in which the lengths of the nanowires vary considerably even though they were grown under the same conditions.

Another disadvantage is that conventional techniques have low nanowire growth yield. That is, conventional techniques for fabricating nanowires are typically unable to produce more than one nanowire 204 per each catalytic particle 202 used in the fabrication process, as shown in FIG. 2. Yet another disadvantage is that the catalytic particles typically remain attached to the nanowires even after the completion of the nanowire fabrication process. The catalytic particles attached to the nanowires may not be desirable in fabrication of various devices.

BRIEF DESCRIPTION OF THE DRAWINGS

The invention is illustrated by way of example and not by way of limitation in the Figures of the accompanying drawings in which like references indicate similar elements. It should be noted that the references to "an" or "one" embodiment of this disclosure are not necessarily to the same embodiment, and such references mean at least one.

DETAILED DESCRIPTION

In the following description, for purposes of explanation, specific details are set forth to provide a thorough understanding of embodiments of the invention. However, it is understood that embodiments may be practiced without these specific details. In other instances, well-known structures and techniques have not been shown in detail to avoid obscuring the understanding of this description.

Figure 1:
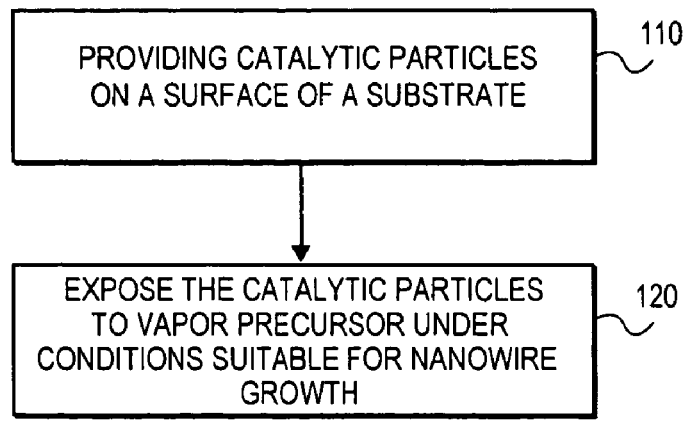
FIG. 1 is a flowchart diagram illustrating a conventional process for forming nanowires from precursor nucleation particles.
Figure 2:
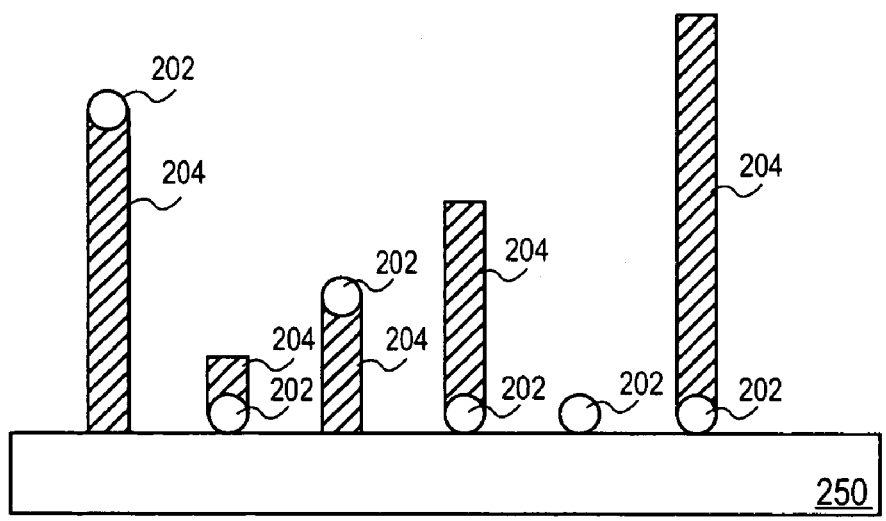
FIG. 2 is a schematic diagram illustrating nanowires grown using a conventional process.
Figure 3:
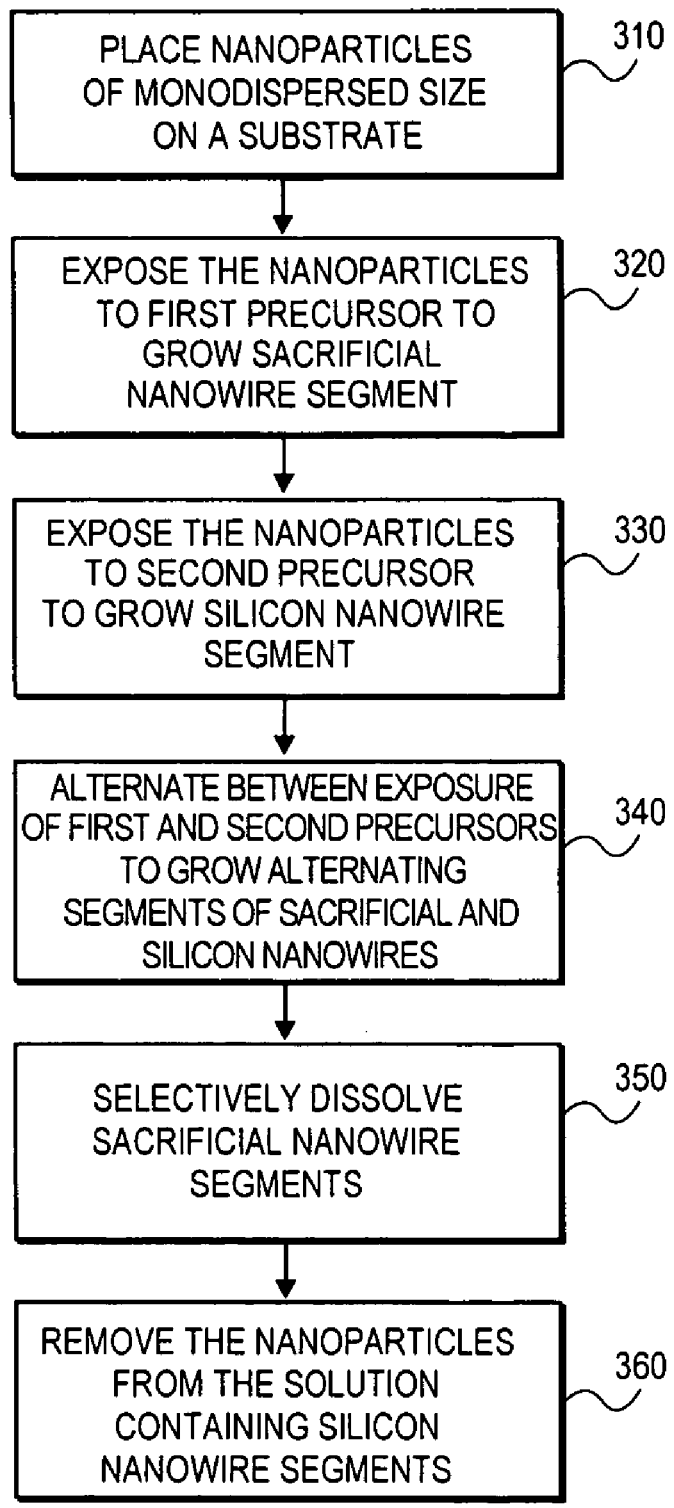
FIG. 3 is a flowchart diagram illustrating a process of growing multiple nanowire segments from a single catalytic particle according to one embodiment.

FIG. 3 shows a process of fabricating multiple nanowire segments of uniform length from a single catalytic particle according to one embodiment. The terms "catalytic particles", "nanoparticles" and "precursor nucleation particles" are used interchangeably herein to refer to any nanoscale particles, such as gold particles, that may be used to catalyze growth of nanowires. The terms "nanowires" and "nanowire segments" are used interchangeably herein to refer to any elongated nanowire structure grown from catalytic particles, such as silicon, germanium, tungsten or molybdenum nanowires. In one embodiment, the diameter of the nanowires is less than 50 nanometers (nm). In another embodiment, the diameter of the nanowires is less than 10 nm.

The growing process starts with nanoparticles dispersed on a surface of a substrate, as shown in block 310. Any suitable substrate may be used, such as silicon, glass or other substrate that is compatible with process temperatures and chemistries. In one embodiment, gold particles are used as catalyst for growing nanowire segments. However, the catalytic particles are not limited to gold. Other suitable catalyst material may be used, including, but not limited to, molybdenum, zinc, silver, copper, cadmium, iron, nickel and cobalt.

In general, the size of the catalytic particles may determine the diameter of the nanowires that grow from them. Accordingly, in one embodiment, nanoparticles of approximately mono-dispersed size are used to grow the nanowire segments having approximately the same diameter.

In one embodiment, multiple nanowire segments are grown from each individual nanoparticle. Multiple nanowire segments produced by each individual nanoparticle may include alternating segments of nanowires made of a first material (e.g., a sacrificial material) and nanowires made of a second material (e.g., non-sacrificial material). In accordance with one embodiment, the first material and the second material have different solubility characteristics. One advantage of using materials of different solubility is that following the growth of the multiple nanowire segments, sacrificial segments may be selectively dissolved such that non-dissolving nanowires are automatically separated into individual segments.

As noted above, one of the problems associated with conventional techniques for growing nanowires is difficulty associated with producing nanowires of uniform lengths. This is because the start of initial nanowire formation will vary from one nanoparticle to another. As a result, nanowire length, which is typically determined by conditions, such as time and temperature, can vary from one nanowire to another. As shown in illustrated example of FIG. 4A, the lengths of the first nanowire segments grown from nanoparticles will vary. However, the length of subsequent nanowire segments can be better controlled since the nanoparticles have already started their nanowire formation. Accordingly, in one embodiment, a sacrificial nanowire segment is initially grown from each nanowire before the desired nanowire segments are subsequently grown.

Referring back to FIG. 3, in block 320, a first precursor such as germane ($GeH_4$) or other vapor precursor is used to initiate growth of a sacrificial nanowire segment (e.g., germanium nanowire segment) from the nanoparticles. Once all or most of the nanoparticles have started their nanowire formation, the nanoparticles are exposed to a second precursor such as silane ($SiH_4$) or other vapor precursor to catalyze growth of a silicon nanowire segment between the germanium nanowire segment and the catalytic particle, in block 330. In one embodiment, the silicon nanowire segments are grown by maintaining a pressure of less than 100 mTorr and a temperature of about 440° C. while flowing between 10 to 80 sccm of Silane ($SiH_4$) (10% in He) for about 5 to 10 minutes. The fabrication conditions for the first precursor and the second precursor may be different. Accordingly, the temperature and/or pressure may need to be modified between the two growth processes. Because the silicon nanowire segments are grown after the nanoparticles have already started their nanowire formation, the silicon nanowire segments of uniform length may be produced by controlling the duration of the silane exposure.

Any suitable process may be used to provide an adequate condition for nanowire growth, including thermal evaporation process, catalytic chemical vapor deposition process, vapor-solid process and laser assisted catalytic growth process.

Figures 4A, 4B:
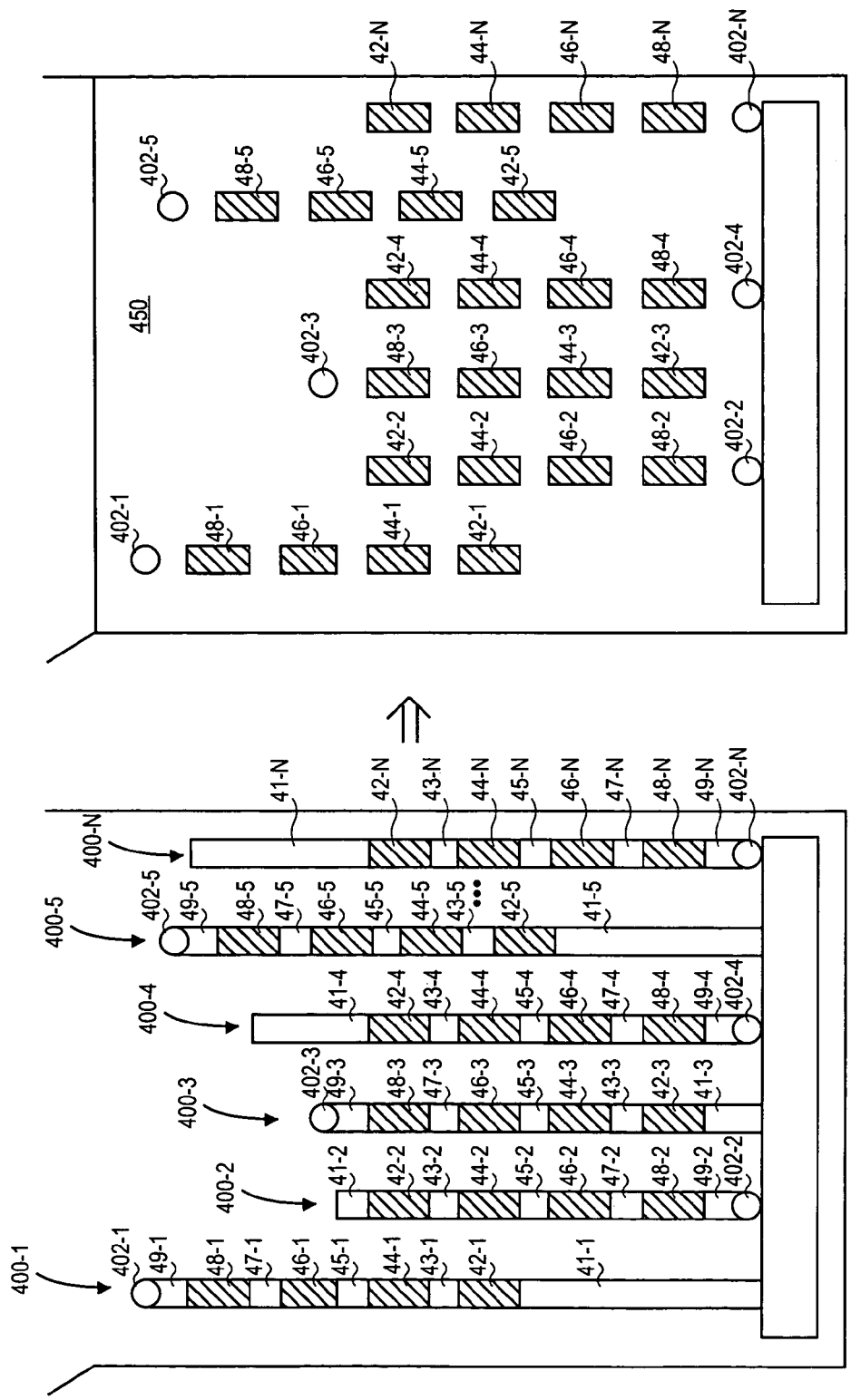
FIGS. 4A and 4B are schematic diagrams illustrating dissolving of sacrificial segments according to one embodiment.

Then, in block 340, the process of exposing the nanoparticles to the first precursor (block 320) and the second precursor (block 330) are repeated until a desired number of segments are grown from each nanoparticle. Alternating between the use of germane and silane will result in alternating segments of germanium and silicon nanowire segments as shown in FIG. 4A. The germanium and silicon nanowire segments have different solubility characteristics. Different nanowire segments having different solubility characteristics may be advantageous because certain nanowire segments made be selectively dissolved without negatively effecting the other nanowire segments. Specifically, in one embodiment, nanowire segments made of germanium may be selectively dissolved without dissolving nanowire segments made of silicon.

Once the formation of nanostructures having a desired number of nanowire segments is completed, the germanium nanowire segments are selectively dissolved in a solution, in block 350. For example, a water solution may be used to selectively dissolve the sacrificial segments. The water solution may contain oxidizing agents (e.g., peroxide) to facilitate the selective dissolving process. Any suitable solution may be used if desired. The selectively dissolving process causes silicon nanowire segments disposed between the germanium segments to separate into individual segments with uniform length. Producing nanowire segments with uniform length may be advantageous in various applications. This may be achieved by controlling the growth conditions during the application of the second precursor (e.g., silane) such that the silicon nanowire segments will have relatively similar length. The length of the silicon segments may be function of exposure time, temperature and pressure.

It should be noted that during the selective dissolving process, the silicon nanowire segments will automatically be separated from their catalytic particles since the germanium nanowire segment attached between the catalytic particle and the first silicon nanowire segment will be dissolved during this process. Following the selective dissolving process, the catalytic particles are removed from a solution containing the silicon nanowire segments in block 360. The process of removing catalytic particles will be described in more detail with reference to FIG. 5.

FIG. 4A and FIG. 4B show nanowire segments before and after the selective dissolving process, respectively. The nanostructures 400-1 through 400-N are shown FIG. 4A as each having nine individual segments 41 through 49. These are merely illustrative examples of the nanostructures that may be fabricated. In general, the nanostructures 400 may be formed of any number of nanowire segments. The nanowire segments 41 through 49 preferably alternate between sacrificial material and non-sacrificial material.

Once a desired number of nanowire segments have been grown from each nanoparticle 402, the nanostructures 400 are immersed within a solution 500 to selectively dissolve sacrificial segments 41, 43, 45, 47, 49, as shown in FIG. 4B. Since the sacrificial segments 41, 43, 45, 47, 49 and silicon nanowire segments 42, 44, 46, 48 have different solubility characteristics, the sacrificial segments can be selectively dissolved without adversely effecting the silicon nanowire segments. In one embodiment, a solution 450 containing water is used to selectively dissolve the sacrificial nanowire segments 41, 43, 45, 47, 49, which are made of germanium.

As noted above, the first segments 41-1 through 41-N grow in variable length because there is little control over synchronizing the initial timing of nanowire formation from one nanoparticle to another. In the illustrated embodiment shown in FIG. 4A, the first segment 41 of each nanostructure is made of sacrificial material. Accordingly, the silicon nanowire segments 42, 44, 46, 48 which are formed after the initial nanowire formation will grow at about the same growth rate. Additionally, as shown in FIG. 4A, the last segment 49-1 through 49-N of each nanostructure is made of sacrificial material (e.g., germanium). Accordingly, none of the silicon nanowire segments 48-1 through 48-N will be attached to the catalytic nanoparticles 402 after the selective dissolving process.

Catalytic particles, such as gold particles, may not be suitable in fabrication of semiconductor devices (e.g., transistor devices) since the particles may cause high junction leakage and low breakdown voltages. In one embodiment, a method is described for removing catalytic particles from a solution containing nanowire segments. Following the separation of nanowire segments from nanoparticles, the catalytic particles, such as the gold particles, are removed by mixing the solution containing nanowire segments and catalytic particles with another solution containing compounds to bond to the catalytic particles.

Figure 5:
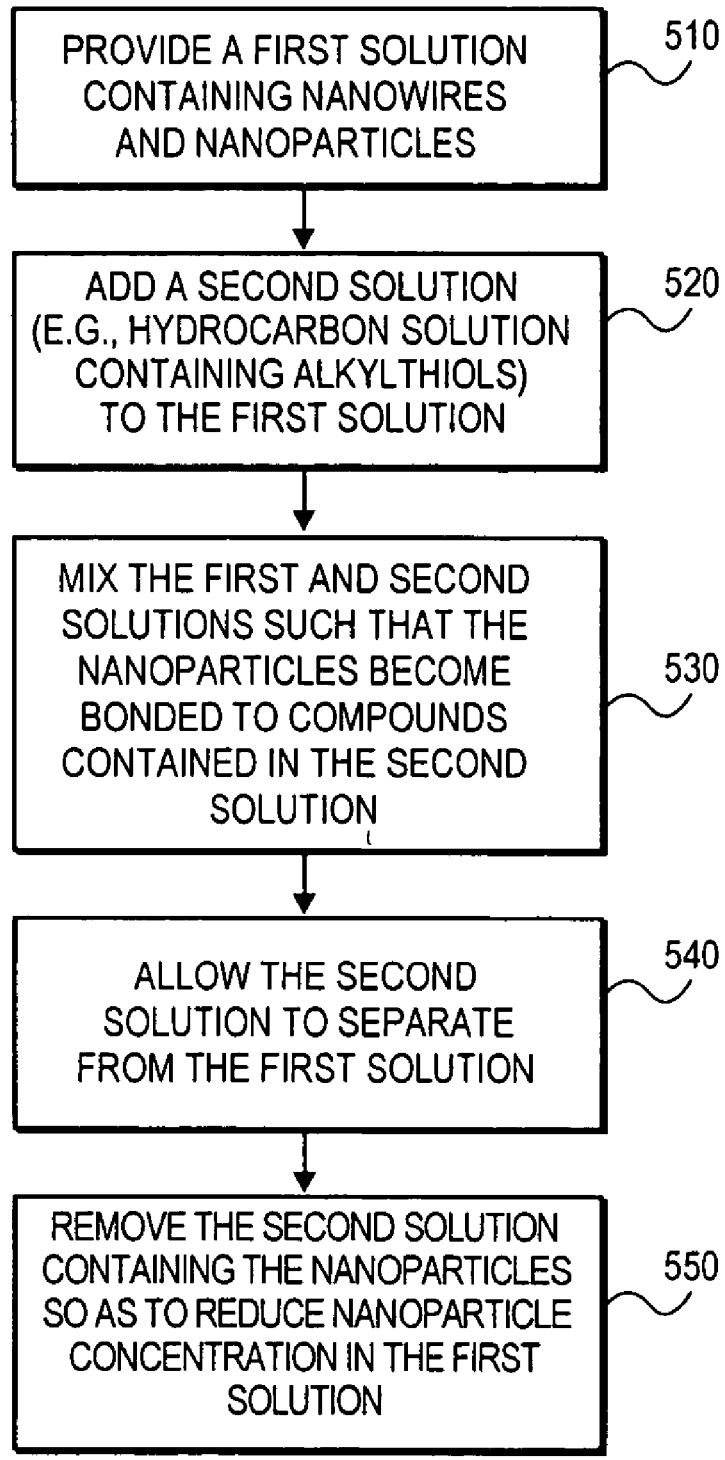
FIG. 5 is a flowchart diagram illustrating a process of removing catalytic particles from a solution containing nanowire segments according to one embodiment.

FIG. 5 shows a process of removing catalytic nanoparticles from a solution containing nanowires according to one embodiment. The nanoparticle removing process begins at block 510, in which a first solution containing nanowires and catalytic nanoparticles is provided. In one embodiment, the nanowire-containing solution contains water and nanoparticles, such as gold particles. A concentration of the catalytic particles is reduced from the first solution by using a second solution containing compounds that are capable of bonding to the nanoparticles. Accordingly, in block 520, a second solution is added to the first solution. For example, a hydrocarbon solution containing long chained thioalkyl compounds may be used as the second solution.

In block 530, the first and second solutions are mixed such that the nanoparticles residing in the first solution generally bond to thioalkyl compounds contained in the second solution. Representatively, the mixing of the two solutions may cause micelle formation making the gold particles soluble in the hydrocarbon solution. Following the mixing process, the first and second solutions are allowed to separate in block 540. This may be accomplished by maintaining the mixed solution for a period of time such that the first and second solutions are separated into an upper layer containing the hydrocarbon solution (i.e., second solution) and a lower layer containing the water solution (i.e., first solution). Specifically, the gold particles will bond with the long chained thioalkyl compounds during the mixing process and will be brought to the upper layer containing hydrocarbon solution, instead of being in the lower layer solution with the nanowire segments.

Once the solution has been separated into upper and lower layers, the upper layer solution containing the nanoparticles is removed, in block 550, for example, by decanting the upper layer solution. This results in the first solution containing a reduced nanoparticle concentration than prior to the nanoparticle removing process. The nanoparticle removing process (blocks 510–550) may be repeated a number of times in order to reduce the nanoparticle concentration to a desired level.

While several embodiments have been described, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
    growing a first nanowire segment from a nanoparticle;
    growing a second nanowire segment between the first nanowire segment and the nanoparticle, wherein the first nanowire segment and the second nanowire segment have a different solubility; and
    sacrificing one of the first nanowire segment and the second nanowire segment.

2. The method of claim 1, further comprising:
    where sacrificing one of the first nanowire segment and the second nanowire segment comprises dissolving the nanowire segment.

3. The method of claim 1, further comprising:
    repeating growing the first nanowire segment and the second nanowire segment in an alternating fashion until a defined number of nanowire segments have been grown from the nanoparticle.

4. The method of claim 1, wherein the second nanowire segment comprises silicon, and the first nanowire segment comprises germanium.

5. The method of claim 1, wherein the second nanowire segment comprises germanium, and the first nanowire segment comprises silicon.

6. The method of claim 1, wherein the nanoparticle comprises a gold particle.

7. The method of claim 1, further comprising:
    growing a third nanowire segment between the second nanowire segment and the nanoparticle, wherein the second nanowire segment and the third nanowire segment have different solubility, and selectively dissolving the first nanowire segment and the third nanowire segment such that the second nanowire segment is separated from the nanoparticle.

8. The method of claim 7, wherein the first and third nanowire segments comprise germanium, and the second nanowire segments comprise silicon.

9. A method comprising:
    placing a plurality of nanoparticles on a substrate;
    exposing the nanoparticles to a first vapor precursor to grow first nanowire segments from the nanoparticles;
    exposing the nanoparticles to a second vapor precursor to grow second nanowire segments between the firs nanowire segments and the nanoparticles, wherein the first nanowire segments and the second nanowire segments comprise material having different solubility; and
    sacrificing one of the first nanowire segments and the second nanowire segments.

10. The method of claim 9, wherein sacrificing comprises selectively dissolving one of the first nanowire segments and the second nanowire segments are separated from the nanoparticles.

11. The method of claim 9, wherein the first vapor precursor is silane and the second vapor precursor is germane.

12. The method of claim 9, wherein the nanoparticles comprises gold.

13. The method of claim 9, further comprising:
    exposing the nanoparticles to the first vapor precursor to grow third nanowire segments between the second nanowire segments and the nanoparticles, wherein the second nanowire segments and the third nanowire segments have different solubility.

14. The method of claim 13, further comprising:
    selectively dissolving the first nanowire segments and the third nanowire segments such that the second nanowire segments are separate from the nanoparticles.

15. The method of claim 13, wherein the first and third nanowire segments comprises germanium, and the second nanowire segment comprises silicon.

16. The method of claim 9, further comprising:
    using a first solution to selectively dissolve a portion of the nanowire segments such that a remaining portion of the nanowire segments are separated from the nanoparticles.

17. The method of claim 16, further comprising:
    reducing a concentration of the nanoparticles from a solution containing the separated nanowire segments.

18. The method of claim 17, wherein reducing a concentration of the nanoparticles from a solution comprises:
    mixing the solution with a hydrocarbon solution containing thioalkyl compounds;
    maintaining the mixed solution for a period time such that the solution is separated into a first layer containing thioalkyl compounds and a second layer containing the nanowire segments; and
    removing the first layer containing the thioalkyl compounds attached to the nanoparticles such that the second layer has a reduced nanoparticle concentration than prior to mixing process.

\* \* \* \* \*

UNITED STATES PATENT AND TRADEMARK OFFICE
CERTIFICATE OF CORRECTION

PATENT NO. : 7,018,549 B2  Page 1 of 1
APPLICATION NO. : 10/748617
DATED : March 28, 2006
INVENTOR(S) : Metz et al.

It is certified that error appears in the above-identified patent and that said Letters Patent is hereby corrected as shown below:

In column 6, at line 6, delete "firs" and insert --first--.

In column 6, at line 15, after "segments" insert --such that the other of the first nanowire segments and the second nanowire segments--.

In column 6, at line 21, after "gold" insert --particles--.

Signed and Sealed this

Tenth Day of February, 2009

JOHN DOLL
*Acting Director of the United States Patent and Trademark Office*